United States Patent
Erdl et al.

(10) Patent No.: US 9,752,745 B2
(45) Date of Patent: Sep. 5, 2017

(54) ILLUMINATION DEVICE FOR A MOTOR VEHICLE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 76 days.

(21) Appl. No.: 14/505,139

(22) Filed: Oct. 2, 2014

(65) Prior Publication Data

US 2015/0016135 A1 Jan. 15, 2015

Related U.S. Application Data

(63) Continuation of application No. PCT/EP2013/053685, filed on Feb. 25, 2013.

(30) Foreign Application Priority Data

Apr. 3, 2012 (DE) ........................ 10 2012 205 437

(51) Int. Cl.
  *F21V 11/00* (2015.01)
  *F21S 8/10* (2006.01)
  (Continued)

(52) U.S. Cl.
  CPC ....... *F21S 48/1721* (2013.01); *F21S 48/1145* (2013.01); *F21S 48/1159* (2013.01);
  (Continued)

(58) Field of Classification Search
  CPC . F21S 48/1721; F21S 48/1145; B60Q 1/0425; B60Q 1/045; B60Q 1/245; B60Q 1/06
  (Continued)

(56) References Cited

U.S. PATENT DOCUMENTS 4,781,445 A 11/1988 Baba et al.
5,138,540 A * 8/1992 Kobayashi ............. B60Q 1/122
   362/268
(Continued)

FOREIGN PATENT DOCUMENTS

CN 1294276 A 5/2001
CN 102037390 A 4/2011
(Continued)

OTHER PUBLICATIONS

International Search Report (PCT/ISA/210) dated May 21, 2013, with English translation (Seven (7) pages).
(Continued)

*Primary Examiner* — Anh Mai
*Assistant Examiner* — Matthew Peerce
(74) *Attorney, Agent, or Firm* — Crowell & Moring LLP

(57) ABSTRACT

An illumination device for a motor vehicle includes a light source consisting of a number of semiconductor diodes, and a scanner onto which a light beam obtained from light of the light source falls and which modifies the position of the light beam during operation of the illumination device and thereby moves a light spot produced by the light beam at a distance from the illumination device. The moved light spot allows a predetermined light distribution to be generated. The illumination device is designed such that the scanning speed at which the light spot is moved, the scanning path along which the light spot is moved, and/or the size of the light spot can be varied and is/are controlled to generate the predetermined light distribution.

18 Claims, 2 Drawing Sheets

(51) Int. Cl.
*G02B 26/10* (2006.01)
*G02B 19/00* (2006.01)

(52) U.S. Cl.
CPC ......... *F21S 48/125* (2013.01); *F21S 48/1731* (2013.01); *F21S 48/1757* (2013.01); *G02B 19/0014* (2013.01); *G02B 19/0061* (2013.01); *G02B 26/101* (2013.01)

(58) Field of Classification Search
USPC ....................................................... 362/510
See application file for complete search history.

(56) References Cited

U.S. PATENT DOCUMENTS

| | | |
|---|---|---|
| 2002/0118464 A1 | 8/2002 | Nishioka et al. |
| 2007/0177250 A1 | 8/2007 | Duncan |
| 2009/0046474 A1 | 2/2009 | Sato et al. |
| 2011/0038057 A1 | 2/2011 | Dharmatilleke et al. |
| 2011/0249460 A1 | 10/2011 | Kushimoto |
| 2012/0069593 A1* | 3/2012 | Kishimoto ............. B60Q 1/076 362/511 |

FOREIGN PATENT DOCUMENTS

| | | |
|---|---|---|
| DE | 10 2009 025 678 A1 | 1/2010 |
| EP | 2 537 708 A2 | 12/2012 |
| JP | 2009-224039 A | 10/2009 |
| JP | 2010-36835 A | 2/2010 |
| JP | 2011-157022 A | 8/2011 |

OTHER PUBLICATIONS

German Search Report dated Dec. 19, 2012, with English translation (Ten (10) pages).

Chinese Office Action issued in counterpart Chinese Application No. 201380013387.8 dated Oct. 10, 2016 with English-language translation (seventeen (17) pages).

* cited by examiner

ILLUMINATION DEVICE FOR A MOTOR VEHICLE

CROSS REFERENCE TO RELATED APPLICATIONS

This application is a continuation of PCT International Application No. PCT/EP2013/053685, filed Feb. 25, 2013, which claims priority under 35 U.S.C. §119 from German Patent Application No. 10 2012 205 437.5, filed Apr. 3, 2012, the entire disclosures of which are herein expressly incorporated by reference.

BACKGROUND AND SUMMARY OF THE INVENTION

The invention relates to an illumination device for a motor vehicle.

Scanning lighting systems for motor vehicles are known from the prior art. The scanning lighting systems use a scanner to deflect a light beam created by at least one semiconductor diode in a suitable manner to yield different light distributions. In general, line scanners perform a line-by-line scan of the illumination area in which the light distribution is to be created at a fixed scanning speed and in a fixed scanning pattern. To create different light distributions, the light output of the semiconductor diodes is varied or the diodes are switched on and off.

Traditional scanning illumination devices have the disadvantage that the semiconductor diodes for generating the predefined light distribution are not operated at full power at all points in time, which means that the light source is not used at its maximum cost/benefit efficiency. To create a light distribution with great detail and precision and a high contrast, a high-frequency scanner scan and a high-frequency modulation of the intensity of the semiconductor diodes over time are also necessary, which in turn presupposes a complex and expensive electronic control system for the illumination device.

The object of the invention is to create a scanning illumination device for a motor vehicle with which a predefined light distribution is generated easily and efficiently.

This and other objects are achieved by an illumination device according to the invention comprising a light source formed of a number of semiconductor diodes and a scanner, on which a beam of light generated by the light of the light source falls. The scanner changes the position of the light beam during operation of the illumination device and thereby moves a light spot created by the light beam at a distance from the illumination device and, in particular, in a high beam of the illumination device. With the moving light spot, a predefined light distribution is generated by use of corresponding control equipment. A plurality of different predefined light distributions can preferably be generated with the illumination device through appropriate control of the control equipment. The term "high beam" is understood to refer to the light distribution at a distance from the illumination device which is much larger than the dimensions of the illumination device, in particular in the range of 25 meters in front of the illumination device. A light beam is understood to be a bundle of light rays limited in angle and/or in space such that the rays of light in the bundle may be essentially parallel or may converge or diverge. The light beam may be created by the light source itself and/or optionally also by one or more optical units between the light source and the scanner.

In contrast with traditional scanning illumination devices, the illumination device according to the invention is designed so that the scanning speed at which the light spot is moved, the scanning path along which the light spot is moved, and/or the size of the light spot can be varied and controlled with suitable control equipment to generate the predefined light distribution. The scanning path corresponds to the pattern of movement of the light spot, which is created by the change in position of the light beam. Through a corresponding definition of a scanning path, the range in which a predefined light distribution occurs can be limited. Furthermore, by passing over the same regions repeatedly according to the defined scanning path, the light intensity in these regions can be increased accordingly.

The illumination device according to the invention has the advantage that due to the available scanning speed, the variable scanning path, and/or the variable light spot size, a predefined light distribution can be adjusted easily and can also be varied, if necessary, while the light distribution is being generated without thereby having to have an influence on the light efficiency of the semiconductor diodes. Any desired light distributions can be implemented with no problem in this way. Furthermore, the scanning speed can be reduced in comparison with traditional line scanners, so that problematical motion effects are prevented.

In a particularly preferred embodiment, a predefined light distribution with locally variable light intensity can be generated with this illumination device, such that the scanning speed is reduced in regions of a predefined light distribution with a high light intensity and/or the light spot passes regions of the predefined light distribution with a higher light intensity more frequently according to the scanning path.

In another embodiment of the illumination device according to the invention, a predefined light distribution with a locally varied resolution can be generated, such that the size of the light spot is reduced in regions of the predefined light distribution with a higher local resolution.

In a particularly preferred embodiment, a laser light source is used as the light source in the illumination device according to the invention. This means that the semiconductor diodes include one or more laser diodes, and in particular only laser diodes. A distribution of light with a very high local light intensity can be created in this way. The laser diodes preferably each have a maximum power of at least 1W and, in particular, between 1.5W and 5W.

In another embodiment, the illumination device according to the invention is designed so that, for generating the predefined light distribution, the numerous semiconductor diodes are operated at a constant power and preferably at maximum power, so that the apparatus is particularly economical to use.

In yet another embodiment of the device according to the invention, the scanner is a vector scanner with which the scanning speed and/or scanning path can be varied in such a way that both the speed and the path can be varied in particular. Thus, the scanning speed and/or scanning path can be varied in a particularly simple manner by using essentially known vector scanners.

In a preferred specific embodiment of the illumination device, an optical unit which the light beam falls onto after passing through the scanner is provided for varying the size of the light spot. This optical unit includes in particular a lens and/or a reflector having a variable focal distance. Such optical elements are known per se and consist of electro-active substances, for example, whose properties change as a result of an electric voltage being applied, such that the focal distance of the lens and/or of the reflector is varied.

In another specific embodiment of the invention, the light source is a monochromatic light source in which a conversion element is provided for converting the light of the light source into white light. Such conversion elements are known per se from the prior art. For example, a phosphorus conversion element made of phosphorus nitride, phosphorus oxynitride or cerium-doped YAG phosphorus may be used with blue/violet laser diodes with an emission wavelength of 450 nm/405 nm to generate white light.

The conversion element, which is designed as a layer in particular, may be arranged in different positions, depending on the embodiment of the invention. The conversion element may be arranged in particular on the light source or between the light source and the scanner. In the latter case, the conversion element is arranged in a position in the path of the light beam before the light beam strikes the scanner. Likewise, however, the conversion element may be arranged in a position in which the light beam has already passed over the scanner.

Depending on the application case, the illumination device according to the invention may assume various functionalities. In one embodiment, the illumination device comprises a headlight. A headlight is characterized in that it actively illuminates the surroundings of a vehicle. The illumination device according to the invention may, if necessary, also comprise a signal light, which is characterized in that it serves only to deliver signals for other traffic participants.

In a preferred variant, the illumination device is designed as a headlight, such that a low-beam light characteristic is generated as a predefined light distribution during operation. This is characterized by a sharp cut-off line (also called a light-dark line), which can be generated easily by controlling the scanning speed, the scanning path and/or the size of the light spot. In particular, the light spot can be reduced in size accordingly in the area of the cut-off line to thereby ensure a high local resolution for this cut-off line. If necessary, the illumination device may also be designed to generate a high-beam characteristic as a predefined light distribution during operation.

In another embodiment of the illumination device according to the invention, a beam limitation device is provided between the light source and the scanner. With this beam limitation device, the cross section of the light beam is limited along a predefined cut-off line. In this case, the illumination device is designed so that one or more cut-off lines are formed with at least one section of the predefined cut-off line in the predefined light distribution. With such an apparatus, sharp cut-off lines can be generated easily due to the predefined limit, which is imaged on the light spot and moves together with it.

In a particularly preferred variant, the beam limitation device comprises an aperture. Then, the cross section of the light beam is limited along the predefined cut-off line by the aperture opening. The aperture may optionally be arranged inside an optical unit, which directs the light beam at the aperture opening and throws the light beam, which is thus directed at the aperture, onto the scanner. This optical unit may comprise, for example, at least one lens in front of the aperture and/or at least one lens downstream from the aperture. Alternatively or additionally, the beam limitation device may also comprise a waveguide, in particular an optical fiber. The cross section of the waveguide in this case determines the limitation of the light beam.

In a preferred variant, the predefined cut-off line, which is created with the beam limitation device, comprises one or more straight lines with which the cut-off line or cut-off lines are formed in the predefined light distribution. The predefined cut-off line is preferably a parallelogram here. With a parallelogram, a low-beam light characteristic can be created over the corresponding directions of its edges, for example. This characteristic usually comprises a straight cut-off line running horizontally in the area of the center of the road surface and a cut-off line running obliquely upward at the edge of the road surface. These cut-off lines can be imaged in the light distribution thereby created by means of corresponding edges of the parallelogram and the movement of the scanner.

In addition to the illumination device according to the invention, the present invention also relates to a motor vehicle which has one or more of the illumination devices according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
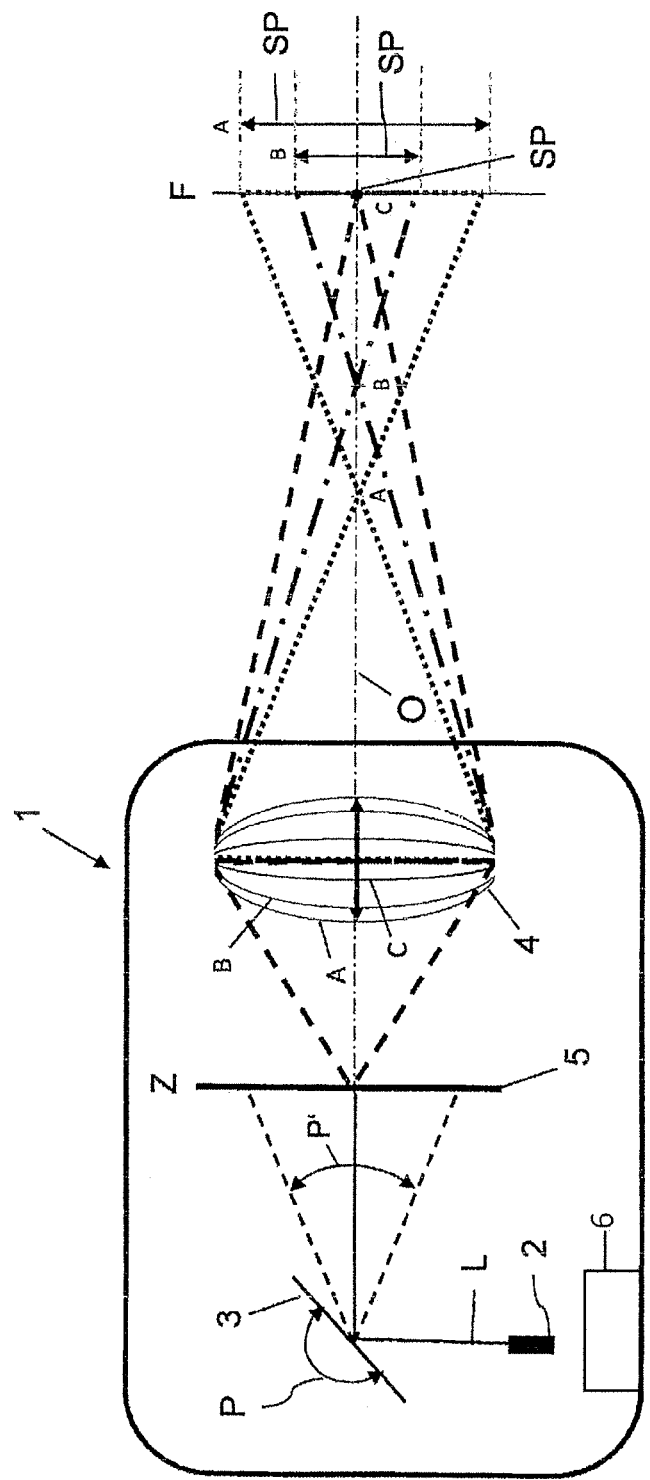
FIG. 1 is a schematic diagram of one specific embodiment of an illumination device according to the invention.

FIG. 1 shows, in a side view, an illumination device 1 according to an embodiment of the invention, which here is a headlight installed in a motor vehicle (not shown). The illumination device 1 comprises a light source 2 in the form of a laser diode with an auxiliary lens, which creates a light beam L of a high luminance. The light beam L strikes a vector scanner 3, which is only indicated schematically here and which deflects the light beam in a predefined angular range by pivoting a suitable reflector element. The pivot range of the scanner in the plane of the page is indicated by the double arrow P and the corresponding pivot range of the light beam L is indicated by the double arrow P'. In addition to pivoting in the plane of the page, which varies the vertical position of the light beam, the scanner can also be pivoted horizontally, so that the position of the light beam can also be varied horizontally.

The vector scanner is controlled with a control unit 6 with which, firstly, the speed of movement of the light beam in the pivot range of the scanner can be varied and/or adjusted in a suitable way, and secondly, the path of movement of the light beam can also be varied and/or adjusted in a suitable way. The vector scanner differs in this way from traditional line scanners, which permit only a constant line-by-line movement of the light beam in a predefined scanning range. Due to the use of the vector scanner, it is possible to generate any predefined light distributions with the illumination device in a simple way, as described in greater detail below.

A monochromatic light beam is focused in the intermediate image plane Z after passing the scanner and is converted there into white light. This monochromatic light beam is created by the laser light source 2. In the plane Z, there is also an essentially known conversion element 5, which is designed as a converter layer. The image created on the converter layer is then converted into a light spot SP by use of an exit lens in the form of a lens 4 with a variable refractive power in the high beam F of the illumination device (indicated by the plane F). This light spot SP changes its position according to the movement of the light beam. FIG. 1 shows how the light spot is generated in the case when the light beam L is situated precisely on the optical axis O. Various light spots of different sizes are indicated here.

Through suitable adjustment and/or variation of the scanning speed and/or the path of movement of the light beam L, the desired light distribution in the high beam F is generated at a distance of approx. 25 m without it being necessary to turn the laser light source 2 on and off and/or to vary its intensity. The laser light source 2 therefore emits light during operation with a fixed power and, preferably, at its maximum power. Depending on the desired light distribution, the light spot SP is moved at a slower scanning speed in regions with a high light intensity. Alternatively or additionally, the light spot may also pass over these regions more frequently. In contrast with that, the light spot is moved more rapidly and/or is deflected there less frequently in regions with a lower desired light intensity.

A light spot of a variable size can be generated with the lens 4 from the intermediate image of the plane Z. Three different settings A, B and C of the lens 4 are shown here, where the setting A corresponds to a short focal distance, the setting B corresponds to a medium focal distance and the setting C corresponds to a great (long or far-field) focal distance of the lens. The beam path after passing the lens 4 is indicated with dotted lines for the setting A, with dash-dot lines for the setting B and with dashed lines for the setting C for the white light spot in the intermediate image plane Z generated with the conversion layer on the optical axis). The point of intersection of the respective beam paths with the optical axis O is, in turn, identified according to the settings A, B and C. For the setting C, this yields a light spot SP, which is very small, essentially a small spot in the high beam F. On the other hand, the settings A and B result in defocusing, so that a light spot with a medium diameter is generated for the setting B and a light spot with a large diameter is generated for the setting A.

Lenses with variable refractive power are essentially known from the prior art and consist of electro-active polymers and/or elastomers, for example, where a change in the focal distance is achieved by applying an electric voltage. The focal distance of the lens 4 is preferably varied by way of the same control unit, which is also used to control the vector scanner 3. The size of the light spot can be varied in the high beam by means of this lens as a function of the desired local resolution in certain ranges of the light distribution. The size of the light spot is increased in particular in regions where only a low resolution of the light distribution is required, whereas the low-beam light characteristic is reduced corresponding to the light spot, in other regions, where the light distribution should have a high resolution, for example, at the cut-off line.

As explained above, the scanning speed and the scanning path of a light spot can be varied with the specific embodiment of FIG. 1 by use of a vector scanner 3, and the size of the light spot can be varied with a lens 4. It may optionally also be possible that only one vector scanner and/or only one lens with a variable refractive power is installed in the illumination device according to the invention to generate the light distribution if the corresponding component is sufficient for the intended purpose of the illumination device. Furthermore, there is also the possibility that the converter layer 5 may be arranged at a different position in the beam path, for example, the converter layer may also be positioned on the light source 2 and/or between the light source 2 and the scanner 3.

Figure 2:
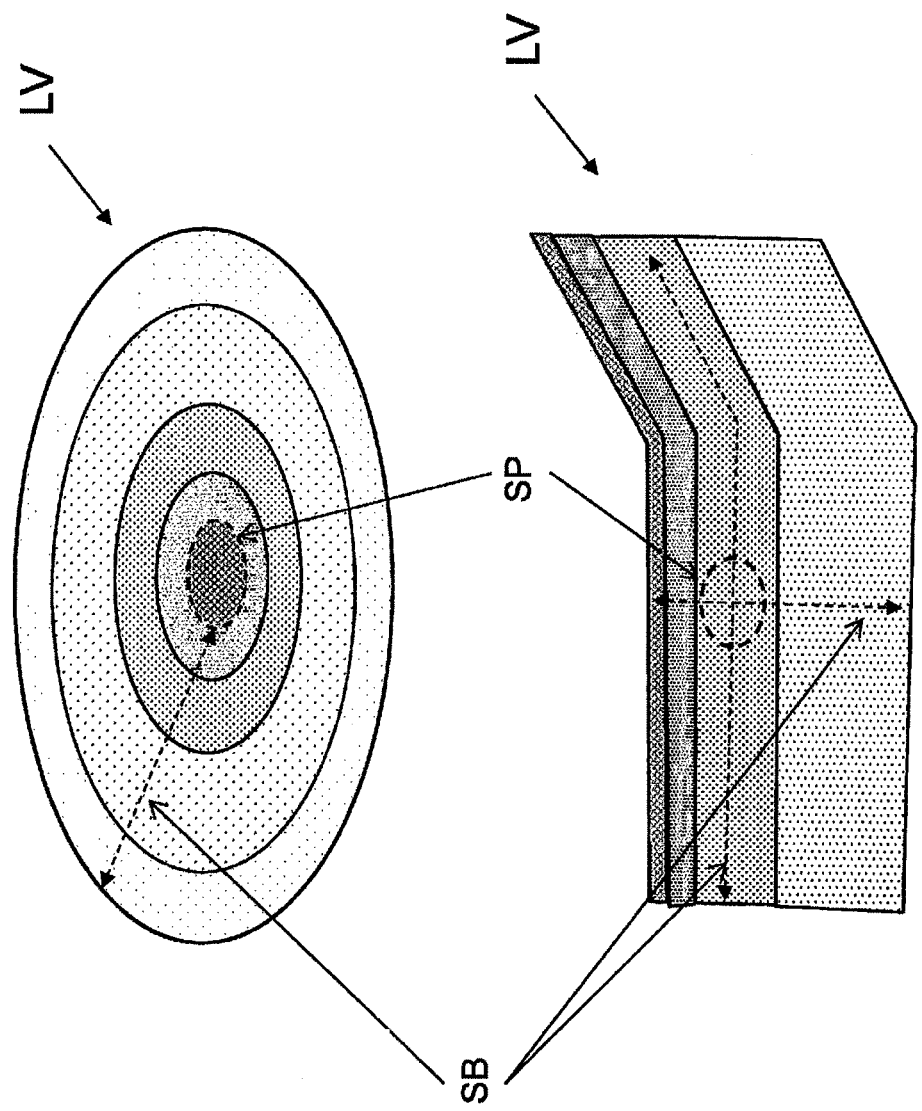
FIG. 2 illustrates examples of two light distributions which can be generated with the illumination device according to the invention.

FIG. 2 shows an example of two light distributions LV in the high beam of the headlight 1, which can be generated by corresponding control of the vector scanner and/or the lens with a variable focal power according to FIG. 1. The light distribution at the top in FIG. 2 is a high-beam light distribution of a motor vehicle, and the light distribution at the bottom in FIG. 2 is a low-beam light distribution. The high-beam light distribution is in the form of an ellipse, where it is indicated schematically by the different shadings of the ellipse that the intensity of the light in the distribution decreases from the inside to the outside. This intensity decreases continuously in the actual light distribution. In contrast with the high-beam light distribution, the low-beam light distribution is in the form of a strip with an upward bend on the right edge (i.e., at the edge of the road surface). Due to the upper edge of the strip, a sharp cut-off line is formed. It is again indicated schematically by different shadings that the intensity of the light in the distribution decreases from top to bottom within the strip. In the actual light distribution, there is a continuous decrease in this intensity.

The two light distributions are generated by a light spot SP, which is an ellipse indicated with dashed lines in FIG. 2. The movement of the spot SP, which is indicated by dashed double arrows SB, can be varied by controlling the vector scanner. The light intensity of the individual regions from FIG. 2 in particular can be changed through a corresponding variation in the scanning speed and/or the frequency at which the light spot passes by corresponding light regions. The light distributions LV presented here are given only as examples and any other light distributions may also be generated.

The specific embodiment of the invention described above has a number of advantages. By using a vector scanner and/or a lens having a variable refractive power, the light source and/or the diodes contained in the light source can be used at maximum power continuously and therefore very efficiently. The light spot is passed by positions of the light distribution of a high luminous density more often or more slowly and/or is deflected more or less in the direction where more or less light intensity is required according to the predefined light distribution. In contrast with traditional line scanners, a high line frequency is unnecessary for the scanning, so it is possible to avoid generating interfering motion effects (e.g., flicker). By varying the size of the light spot with the lens, it is also possible to alter the local resolution of the light distribution. In this way, without any great technical effort, special structures and/or properties can be represented by light distributions.

LIST OF REFERENCE NUMERALS

1 illumination device
2 light source
3 scanner
4 lens
5 conversion layer
6 control unit
L light beam
P, P' arrows
Z intermediate image plane
A, B, C variable settings of the lens
F high-beam SP light spot
O optical axis
LV light distribution
SB movement of the light spot The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An illumination device for a motor vehicle, comprising:
   a light source formed of a number of semiconductor diodes; and
   a vector scanner arranged in a path of a light beam generated by light of the light source, the scanner having a control unit configured to control the vector scanner to generate a light spot at a distance from the illumination device and to form a predefined light distribution larger than the light spot at the distance from the illumination device by changing a position of the light beam during operation of the illumination device,
   wherein the control unit is configured to be capable of controlling changing of vector scanner properties including a scanning speed at which the light spot is moved, a scanning path along which the light spot is moved, and a size of the light spot, and is configured to control at least one of the vector scanner properties to vary a local light intensity within the predetermined light distribution without varying an intensity of the light beam.

2. The illumination device according to claim 1, wherein the control unit is configured to control the vector scanner to generate the predefined light distribution having the locally varied light intensity by reducing the scanning speed in regions of the predefined light distribution having a higher light intensity and/or passing the light spot more frequently by the regions with the higher light intensity according to the scanning path.

3. The illumination device according to claim 2, wherein the predefined light distribution with the locally varied light intensity is generated by the control unit control of the vector scanner by reducing the size of the light spot in regions having the higher light intensity using optics arranged in the illumination device downstream of the scanner.

4. The illumination device according to claim 1, wherein the predefined light distribution with the locally varied light intensity is generated by the control unit control of the sector scanner by reducing the size of the light spot in regions having the higher light intensity using optics arranged in the illumination device downstream of the scanner.

5. The illumination device according to claim 1, wherein the number of semiconductor diodes comprises one or more laser diodes.

6. The illumination device according to claim 1, wherein the number of semiconductor diodes are controlled by the control unit at a constant power when generating the predefined light distribution.

7. The illumination device according to claim 6, wherein the constant power is a maximum power output of the semiconductor diodes.

8. The illumination device according to claim 1, wherein the optics comprise a lens and/or a reflector having a variable focal distance.

9. The illumination device according to claim 1, wherein the light source generates monochromatic light, and further comprising a conversion element operable to convert the monochromatic light of the light source into white light.

10. The illumination device according to claim 9, wherein the conversion element is arranged: (i) on the light source, (ii) between the light source and the scanner, or (iii) downstream of the scanner.

11. The illumination device according to claim 1, wherein the illumination device comprises a headlight.

12. The illumination device according to claim 11, wherein the headlight is configured to generate a low-beam light characteristic and/or a high-beam light characteristic as the predefined light distribution.

13. The illumination device according to claim 1, wherein the illumination device comprises a signal lamp.

14. The illumination device according to claim 1, further comprising:
   a beam limitation device arranged between the light source and the scanner, the beam limitation device being configured to limit a cross-section of the light beam along a predefined cut-off line, wherein
   one or more cut-off lines are formed in the predefined light distribution with at least one section of the predefined cut-off line.

15. The illumination device according to claim 14, wherein the beam limitation device comprises an aperture and/or an optical fiber.

16. A motor vehicle, comprising:
   one or more illumination devices, each illumination device comprising:
      a light source formed of a number of semiconductor diodes; and
      a vector scanner arranged in a path of a light beam generated by light of the light source, the scanner having control unit configured to control the vector scanner to generate a light spot at a distance from the illumination device and to form a predefined light distribution at the distance from the illumination device larger than the light spot by changing a position of the light beam during operation of the illumination device
      wherein
         the control unit is configured to be capable of controlling changing of vector scanner properties including a scanning speed at which the light spot is moved, a scanning path along which the light spot is moved, and a size of the light spot, and is configured to control at least one of the vector scanner properties to vary a local light intensity within the predetermined light distribution without varying an intensity of the light beam.

17. A method of operating an illumination device comprising a light source formed of a number of semiconductor diodes and a vector scanner having a control unit configured to control operation of the vector scanner in a manner that changes a position of a light beam generated by light of the light source, the method comprising the acts of:
   during operation of the illumination device, using the control unit to control the vector scanner to move a light spot generated by the light beam at a distance from the illumination apparatus to produce a predefined light distribution larger than the light spot at the distance from the illumination device; and
   varying a local light intensity within the predetermined light distribution without varying an intensity of the light beam using the control unit, the control unit being configured to be capable of controlling changing of vector scanner properties including a scanning speed of the vector scanner by which the light spot is moved, a scanning path produced by the vector scanner along which the light spot is moved, and a size of the light spot and configured to vary at least one of the vector properties to vary the local light intensity.

18. The method according to claim 17, wherein the varying act further comprises the act of:

reducing, using the control unit of the vector scanner, the scanning speed in regions of the predefined light distribution that are to have a higher light intensity or controlling the scanning path to pass the light spot more frequently by the regions that are to have the higher light intensity.

* * * * *